Sept. 2, 1924.

W. H. SILVER

MEANS FOR MOUNTING DISKS

Filed Sept. 10, 1920

1,506,782

Witness:
E. Wilderson

Inventor:
Walker H. Silver
by Attorneys

Patented Sept. 2, 1924.

1,506,782

UNITED STATES PATENT OFFICE.

WALTER H. SILVER, OF MOLINE, ILLINOIS, ASSIGNOR TO DEERE & COMPANY, OF MOLINE, ILLINOIS, A CORPORATION OF ILLINOIS.

MEANS FOR MOUNTING DISKS.

Application filed September 10, 1920. Serial No. 409,427.

*To all whom it may concern:*

Be it known that I, WALTER H. SILVER, a citizen of the United States, and a resident of Moline, in the county of Rock Island and State of Illinois, have invented certain new and useful Improvements in Means for Mounting Disks, of which the following is a specification, reference being had to the accompanying drawings.

My invention relates to means for mounting disks particularly designed for use in connection with disk plows. The object of the invention is to provide a new and improved form and arrangement of parts by the use of which the stresses in all directions upon the disk are received and sustained by anti-friction devices suitably positioned with respect to such forces for reducing the friction to a minimum, and by the use of which the disk is locked in position upon its supporting parts by certain of the anti-friction devices. The preferred means by which I have accomplished my object are illustrated in the drawings and hereinafter described. That which I believe to be new and desire to cover by Letters Patent is set forth in the claims.

In the drawings,—

Referring to the several figures of the drawings in which corresponding parts are indicated by the same reference characters,—

Figure 1:
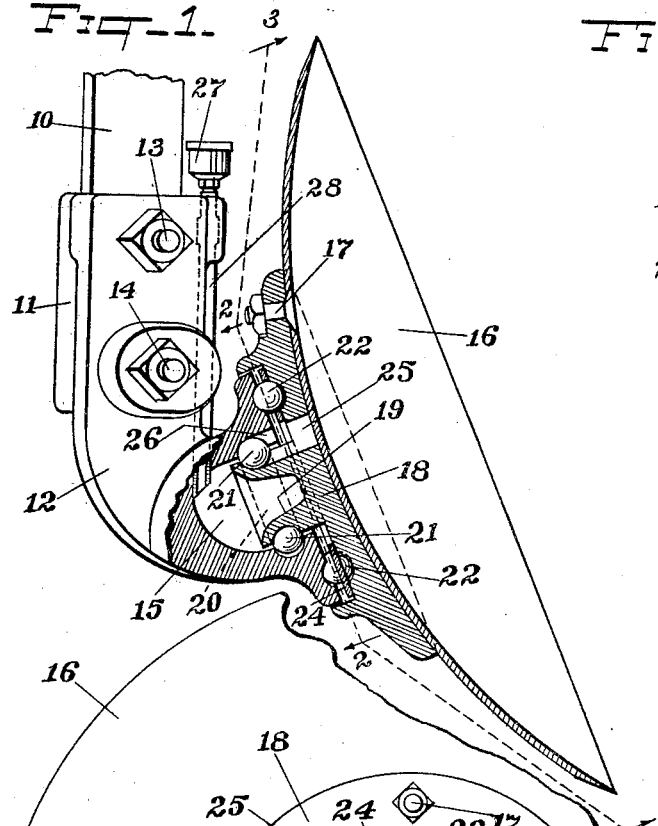
Fig. 1 is a central vertical section through a disk and the means by which it is mounted in position.
Figure 2:
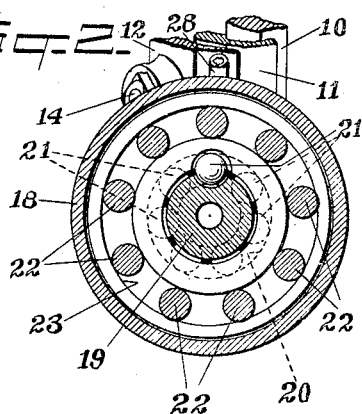
Fig. 2 is a vertical cross-section taken on line 2—2 of Fig. 1.
Figure 3:
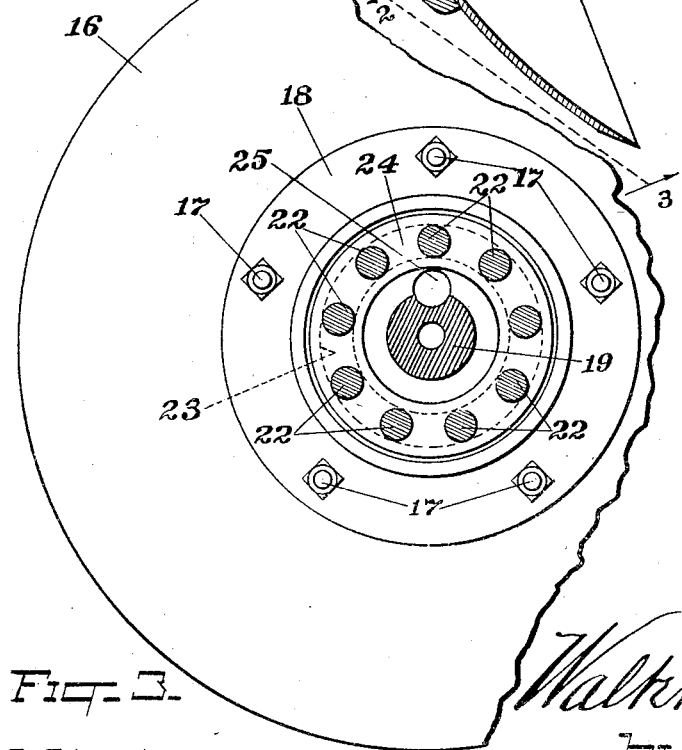
Fig. 3 is a vertical cross-section taken on line 3—3 of Fig. 1.

10 indicates a standard depending from the frame of a disk plow or other structure upon which it is desired to mount a disk. 11 indicates a clamping block interposed between the lower end of the standard 10 and a mounting member or bracket 12 which is held in position by bolts 13 and 14. As is clearly shown in Fig. 1, the lower end of the bracket 12 is turned so as to extend toward one side, being provided with a socket 15 in its outer end, the socket being diagonally-disposed so as to open upwardly to a slight extent. So shaping the socket not only provides for mounting a disk in place at the desired inclination, but it provides for the retention in the lower part of the socket of a small quantity of lubricating oil that is fed to the socket in the manner described hereinafter.

16 indicates a ground-working disk secured by means of a series of bolts 17 upon the face of a mounting member 18 which is rotatably mounted, as hereinafter described, upon the mounting member 12 carried by the standard. In the construction shown the disk 16 is quite sharply dished, as is common practice in connection with disk plow structures, but the disk may have any appropriate form.

The mounting member 18 carried by the disk comprises a boss 19 which has a loose fit in the end of the socket 15 of the mounting member 12. The outer face of the boss 19 and the inner face of the socket 15 are provided with peripheral grooves adapted to be brought into registration, as shown in Fig. 1, for providing a raceway 20 adapted to be provided with a plurality of bearing balls 21. As will be readily understood from an inspection of Fig. 1, the arrangement is such that the balls 21 are adapted to connect the mounting member 18 rotatably with the mounting member 12, serving to prevent the removal of the boss 19 from the socket 15. The balls 21 serve also as anti-friction devices for taking up the side strain of the disk upon the standard and also for taking up the strains of the disk upon the standard in the direction of the axis about which the disk is rotatable.

Auxiliary means is provided in addition to the anti-friction device comprising the balls 21 for taking up the thrust of the disk toward the standard. This means comprises a series of balls 22 mounted in a raceway 23 concentric with the raceway 20 but of a larger diameter. As is best shown in Fig. 1, the balls 22 are held in position by an annular retainer 24 in oppositely-disposed grooves forming the raceway 23. By the provision of the two sets of anti-friction devices, one of which takes up the major portion of the vertical thrust of the disk and the other of which takes care of the horizontally-directed pressure from the disk upon the standard, I have provided a very efficient structure which is adapted to take care of all the various stresses and strains which are brought to bear upon the parts in the heavy work which the structure is designed to do. By the arrangement of the parts as illustrated, all canting or twisting strains are taken care of without undue strain upon the mounting mechanism and with a minimum of friction.

The balls 21 are inserted in the raceway 20 through an opening 25 through the mounting member 18 and through a suitable opening 26 formed by longitudinally-extending grooves in the outer wall of the boss 19 and the inner wall of the socket 15, such opening 25 being closed by the disk 16 when in position upon the mounting member 18. As will be readily understood, the bracket 18 is rotatably mounted in position upon the bracket 12 before the disk 16 is secured in position.

Means is provided for feeding a suitable lubricant to the diagonally-disposed socket 15. In the construction shown this means comprises an oil cup 27 located near the upper edge portion of the disk 16 connected by a tube 28 with the socket, as is clearly shown in Fig. 1.

So far as I am aware, I am the first in the art to provide for locking a disk in position through the medium of the anti-friction devices by which the disk is supported upon its mounting bracket, and my claims are to be construed accordingly. While I prefer to provide the boss 19 upon the disk mounting member and the socket 15 in the mounting member carried by the standard, it will be understood that I do not wish to be restricted to this construction except as hereinafter specifically claimed.

What I claim as my invention and desire to secure by Letters Patent, is—

1. In combination, a disk, a standard, two mounting members each supported wholly by one of said parts, and a plurality of anti-friction devices interposed between said mounting members for rotatably securing the disk to the standard.

2. In combination, a disk, a standard, members carried wholly by said standard and disk respectively, one of said members projecting into the other, and a plurality of anti-friction devices interposed between said members and constituting a means for rotatably securing the disk to the standard.

3. In combination, a disk, a standard, mounting members carried by said disk and standard respectively, and an anti-friction bearing mechanism interposed between said members, and serving as a means for rotatably securing said standard to the disk, one of said members having an opening for the passage into operative position of anti-friction devices.

4. In combination, a disk, a standard, mounting members carried by said standard and said disk respectively, and anti-friction bearing devices interposed between said members, and serving as a means for rotatably securing said disk member to the standard member, said disk member having an opening for the passage into operative position of said anti-friction devices, which opening is normally closed by the disk.

5. In combination, a disk, a standard, mounting members carried by said disk and standard respectively, and means rotatably securing said disk member with said standard member, said means comprising a boss on one of said members that extends into a socket in the other member, and anti-friction devices positioned in a raceway formed in the adjacent side walls of the boss and the socket, the said disk member having an opening therethrough for the passage of said anti-friction devices to said raceway, which opening is normally closed by the disk.

6. In combination, a disk, a standard, mounting members carried by said standard and said disk respectively, and means rotatably connecting said mounting members, comprising a boss axially disposed on the mounting member of said disk extending into a socket formed in the mounting member carried by the standard, and anti-friction devices positioned in a raceway formed in the adjacent side walls of the boss and the sockets.

7. In combination, a disk, a standard, mounting members carried by said standard and said disk respectively, and means rotatably connecting said mounting members, comprising a boss axially disposed on the mounting member of said disk extending into a socket formed in the mounting member carried by the standard, and bearing balls running in a raceway in the form of oppositely-disposed circumferential grooves in the outer face of the boss and the inner face of the socket.

8. In combination, a disk, a standard, mounting members carried by said standard and said disk respectively, a boss on one of said members extending into a socket in the other member, anti-friction devices positioned in a raceway formed in the adjacent side walls of the boss and the socket and serving to rotatably connect said two members, and means for delivering lubricant to said socket for lubricating said anti-friction devices, said socket being adapted to retain a small quantity of lubricant at one side of said raceway when the standard and disk are in normal operative position.

9. In combination, a disk, a standard, mounting members carried by said standard and said disk respectively, a boss on one of said members extending into a socket in the other member, anti-friction devices positioned in a raceway formed in the adjacent side walls of the boss and the socket and serving rotatably to connect said two members, said socket being diagonally-disposed so as to open upwardly at its outer end, and to retain a small body of lubricant when the standard and disk are in normal operative position, and means for delivering lubricant to said socket.

10. In combination, a disk, a standard, mounting members carried by said standard and said disk respectively, a boss on one of said members extending into a socket in the other member, anti-friction devices positioned in a raceway formed in the adjacent side walls of the boss and the socket and serving rotatably to connect said two members, said socket being diagonally-disposed so as to open upwardly at its outer end and to retain a small body of lubricant when the standard and disk are in normal operative position, an oil cup mounted on said standard near the upper edge portion of said disk, and a tube leading from said oil cup to said socket for conducting lubricant from said oil cup to said anti-friction devices.

11. In combination, a disk, a standard, mounting members carried by said standard and said disk respectively, an anti-friction bearing mechanism interposed between said members and serving as a means for connecting said members rotatably together, and a second anti-friction bearing mechanism interposed between said members for taking up the thrust of the disk toward the standard.

12. In combination, a disk, a standard, mounting members carried by said standard and said disk respectively, a boss on one of said members extending into a socket in the other member, anti-friction devices positioned in a raceway formed in the adjacent side walls of the boss and the socket and serving rotatably to connect said two members, and a second anti-friction bearing mechanism interposed between said members between said first-named anti-friction bearing and said disk for taking up the thrust of the disc toward the standard.

13. In combination, a disk, a standard, mounting members carried by said standard and said disk respectively, a boss on one of said members extending into a socket in the other member, anti-friction devices positioned in a raceway formed in the adjacent side walls of the boss and the socket and serving rotatably to connect said two members, and a second anti-friction bearing mechanism arranged concentrically about said boss at a distance therefrom for taking up the thrust of the disk toward the standard.

14. In combination, a disk, a standard, mounting members carried by said standard and said disk respectively, a boss axially disposed on the mounting member of said disc extending into a socket formed in the mounting member carried by the standard, anti-friction devices positioned in a raceway formed in the adjacent side walls of the boss and the socket and serving rotatably to connect said two members, said socket being diagonally-disposed so as to open upwardly at its outer end, a second anti-friction bearing mechanism arranged concentrically about said boss at a distance therefrom for taking up the thrust of the disk toward the standard, and means for feeding lubricant to said socket for lubricating both of said bearings.

15. In combination, a disk, a standard, mounting members carried by said standard and said disk respectively, and means rotatably connecting said mounting members, comprising a boss on one of said members extending into a socket in the other member, and anti-friction devices positioned in a raceway formed in the adjacent side walls of the boss and the socket, the member upon which said boss is mounted having an opening therethrough for the insertion of said anti-friction devices, said opening being closed by the operation of mounting said member upon the part by which it is carried.

16. In combination, a disk, a standard, mounting members carried by said standard and said disk respectively, and means rotatably connecting said mounting members, comprising a boss axially disposed on the mounting member of said disk extending into a socket formed in the mounting member carried by the standard, and anti-friction devices positioned in a raceway formed in the adjacent side walls of the boss and the socket, said disk mounting member having an opening therethrough for the insertion of said anti-friction devices, said opening being closed by the disk when in position thereon.

WALTER H. SILVER.